(12) United States Patent
Wahlstrom et al.

(10) Patent No.: US 9,318,778 B2
(45) Date of Patent: Apr. 19, 2016

(54) SYSTEMS AND METHODS FOR BATTERY SYSTEM TEMPERATURE ESTIMATION

(71) Applicant: GM GLOBAL TECHNOLOGY OPERATIONS LLC, Detroit, MI (US)

(72) Inventors: Michael Wahlstrom, Walled Lake, MI (US); Ciro A. Spigno, Jr., Waterford, MI (US); David R. Clark, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 64 days.

(21) Appl. No.: 14/489,165

(22) Filed: Sep. 17, 2014

(65) Prior Publication Data
US 2016/0079633 A1    Mar. 17, 2016

(51) Int. Cl.
| | | |
|---|---|---|
| *H01M 10/50* | (2006.01) |
| *H01M 10/42* | (2006.01) |
| *G01K 3/04* | (2006.01) |
| *H01M 10/613* | (2014.01) |
| *H01M 10/6567* | (2014.01) |
| *H01M 10/625* | (2014.01) |
| *H01M 10/48* | (2006.01) |
| *H01M 10/60* | (2014.01) |
| *H01M 10/633* | (2014.01) |
| *H01M 10/635* | (2014.01) |
| *H01M 10/617* | (2014.01) |

(52) U.S. Cl.
CPC ............... *H01M 10/425* (2013.01); *G01K 3/04* (2013.01); *H01M 10/486* (2013.01); *H01M 10/60* (2015.04); *H01M 10/613* (2015.04); *H01M 10/625* (2015.04); *H01M 10/6567* (2015.04); *H01M 10/617* (2015.04); *H01M 10/633* (2015.04); *H01M 10/635* (2015.04); *H01M 2010/4278* (2013.01); *H01M 2220/20* (2013.01)

(58) Field of Classification Search
CPC . H01M 10/60; H01M 10/486; H01M 10/617; H01M 10/633; H01M 10/635
See application file for complete search history.

(56) References Cited

U.S. PATENT DOCUMENTS

2014/0372055 A1*  12/2014  Wang .................... G01K 13/00
                                                         702/63

* cited by examiner

*Primary Examiner* — Patrick Ryan
*Assistant Examiner* — Ben Lewis
(74) *Attorney, Agent, or Firm* — Philips Ryther & Winchester; John P. Davis

(57) ABSTRACT

System and methods for estimating a temperature of a battery are presented. In some embodiments, a method of estimating a temperature of a battery system may utilize measured battery system temperature data and measured ambient temperature data. Based on the measured temperature data, an average estimated temperature of the battery system may be determined using, at least in part, an extended Kalman filter and an energy balance process model associated with the battery system.

20 Claims, 5 Drawing Sheets

SYSTEMS AND METHODS FOR BATTERY SYSTEM TEMPERATURE ESTIMATION

TECHNICAL FIELD

This disclosure relates to systems and methods for estimating a temperature of a battery pack. More specifically, but not exclusively, the systems and methods disclosed herein relate to estimating a temperature of a vehicle battery pack using an extended Kalman filter.

BACKGROUND

Passenger vehicles often include electric batteries for operating features of a vehicle's electrical and drivetrain systems. For example, vehicles commonly include a 12V lead-acid automotive battery configured to supply electric energy to vehicle starter systems (e.g., a starter motor), lighting systems, and/or ignition systems. In electric, fuel cell ("FC"), and/or hybrid vehicles, a high voltage ("HV") battery system (e.g., a 360V HV battery system) may be used to power electric drivetrain components of the vehicle (e.g., electric drive motors and the like). For example, an HV rechargeable energy storage system ("ESS") included in a vehicle may be used to power electric drivetrain components of the vehicle.

Monitoring a temperature of a battery system may allow for more accurate battery system control and/or management decisions to be made based on such information, thereby improving overall battery performance. Accurate knowledge of the temperature of a battery system may further allow for improved diagnostics and/or prognostic methods to identify potential battery system issues. Conventional methods for estimating the temperature of a battery system may utilize a plurality of temperature sensors (e.g., thermistors) within the battery system configured to provide an indication of temperature. Such methods, however, may not provide a particularly accurate estimate of average temperature within a vehicle battery system, thereby leading to poorer vehicle drivability and/or increased vehicle energy usage and/or more rapid battery capacity degradation. Moreover, utilizing a plurality of temperature sensors to estimate temperature within a vehicle battery system may introduce increased initial production costs as well and ongoing repair and/or warranty costs.

SUMMARY

Systems and methods disclosed herein may, among other things, provide for more accurate determination and/or estimation of a temperature of a battery system, thereby improving battery system control, management, and diagnostic decisions. In some embodiments, the disclosed systems and methods may reduce and/or eliminate the use of a plurality of temperature sensors within the battery system when compared to conventional temperature estimation methods. Embodiments disclosed herein may further reduce initial and ongoing costs associated with including a plurality of temperature estimation sensors, such as thermistors, in a vehicle battery system.

In certain embodiments, the systems and methods disclosed herein may estimate a temperature of a battery system using, at least in part, an extended Kalman filter ("EKF"). In some embodiments, the EKF may utilize a series of temperature measurements (e.g., measurements observed over time) to produce an estimate of battery system temperature that may be more accurate than a single temperature measurement. The EKF may operate recursively on new temperature measurements received in a series of measurements and produce a battery system temperature estimate with increased accuracy. In certain embodiments, the EFK may be configured to operate in real time using new input temperature measurements and results derived based on previously received temperature measurements.

In certain embodiments, the EFK may utilize at least two computational stages: a predication stage and an update stage. In the prediction stage, a battery temperature may be estimated based on a process model and a measurement model. An uncertainty (e.g., a process error covariance) associated with the estimated temperature may also be predicted. The estimated temperature and predicted uncertainty may be passed to the update stage, where measurement uncertainty (e.g., a measurement error covariance) and a Kalman gain may be calculated, and the estimated temperature state measurement may be updated. This information may be provided to the prediction stage for recursive temperature estimation.

In some embodiments, a method for estimating the temperature of a battery system may include receiving battery system temperature measurement data from one or more first temperature sensors associated with the battery system. Ambient temperature measurement data associated with an ambient temperature proximate to the battery system may further be received from one or more second sensors associated with the battery system. Based on the battery system temperature measurement data, the ambient temperature measurement data, an energy balance process model associated with the battery system, and a temperature parameter and using, at least in part, an extended Kalman filter, an average estimated temperature of the battery system may be determined.

In certain embodiments, the temperature parameter may be associated with a cooling system configured to cool the battery system during operation (e.g., an inlet coolant temperature, an outlet coolant temperature, etc.). The temperature parameter may be determined based on a coolant temperature-based measurement model, an operational state of the cooling system, a sum of the average estimated temperature of the battery system and an offset temperature when the cooling system is in an active heating state, a difference between the average estimated temperature of the battery system and an offset temperature when the cooling system is in an active cooling state, an average estimated temperature of the battery system when a pump of the cooling system is in an off state, a measured coolant temperature when a pump of the cooling system is in an on state but neither actively heating nor actively cooling, and/or the like.

In certain embodiments, the aforementioned method may be performed by battery control electronics associated with a battery pack and/or implemented using a non-transitory computer-readable medium storing associated executable instructions.

In further embodiments, a system is disclosed that may include a battery system, one or more first temperature sensors configured to measure temperature data associated with the battery system, one or more second temperature sensors configured to measure ambient temperature data associated with an ambient temperature proximate to the battery system, and/or one or more current sensors configured to measure current data associated with the battery system. The system may further include battery control electronics commutatively coupled to the various elements.

The battery control electronics may be configured to, among other things, receive the battery system temperature measurement data, the ambient temperature measurement data, and the current measurement data. Based on the received data, the battery control electronics may utilize, at least in part, an extended Kalman filter in connection with an energy balance process model associated with the battery system and a temperature parameter associated with the cooling system to determine an average estimated temperature of the battery system.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Figure 1:
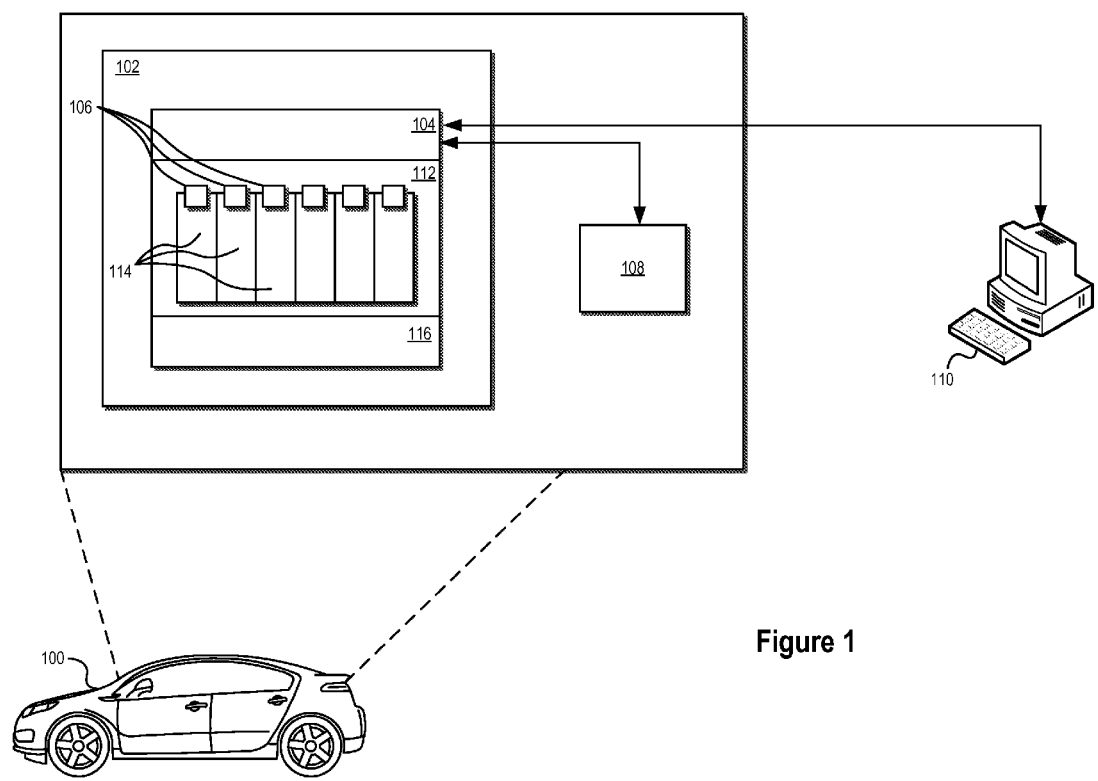
FIG. 1 illustrates an exemplary system for estimating a temperature of a battery system in a vehicle consistent with embodiments disclosed herein.

FIG. 1 illustrates an exemplary system for estimating a temperature of a battery system 102 in a vehicle 100 consistent with embodiments disclosed herein. The vehicle 100 may be a motor vehicle, a marine vehicle, an aircraft, and/or any other type of vehicle, and may include an internal combustion engine ("ICE") drivetrain, an electric motor drivetrain, a hybrid engine drivetrain, an FC drivetrain, and/or any other type of drivetrain suitable for incorporating the systems and methods disclosed herein. The vehicle 100 may include a battery system 102 that, in certain embodiments, may be an HV battery system. The HV battery system may be used to power electric drivetrain components (e.g., as in an electric, hybrid, or FC power system). In further embodiments, the battery system 102 may be a low voltage battery (e.g., a lead-acid 12V automotive battery) and may be configured to supply electric energy to a variety of vehicle 100 systems including, for example, vehicle starter systems (e.g., a starter motor), lighting systems, ignition systems, and/or the like.

The battery system 102 may include a battery control system 104. The battery control system 104 may be configured to monitor and control certain operations of the battery system 102. For example, the battery control system 104 may be configured to monitor and control charging and discharging operations of the battery system 102. In certain embodiments, the battery control system 104 may be utilized in connection with the methods disclosed herein to estimate a temperature of the battery system 102. In certain embodiments, the battery control system 104 may be communicatively coupled with one or more sensors 106 (e.g., voltage sensors, current sensors, temperature sensors, and/or the like, etc.) and/or other systems configured to enable the battery control system 104 to monitor and control operations of the battery system 102. For example, sensors 106 may provide battery control system 104 with information used to estimate a temperature, a capacity, a state of charge ("SOC") and/or a state of health ("SOH"), estimate a resistance, measure a current, and/or measure voltage of the battery system 102 and/or its constituent components.

The battery control system 104 may further be configured to provide information to and/or receive information from other systems included in the vehicle 100. For example, the battery control system 104 may be communicatively coupled with an internal vehicle computer system 108 and/or an external computer system 110 (e.g., via a wireless telecommunications system or the like). In certain embodiments, the battery control system 104 may be configured, at least in part, to provide information regarding the battery system 102 (e.g., information measured by sensors 106 and/or determined by control system 104) to a user of the vehicle 100, vehicle computer system 108, and/or external computer system 110. Such information may include, for example, capacity, SOC, and/or SOH information, battery operating time information, battery operating temperature information, and/or any other information regarding the battery system 102 and/or an environment surrounding the vehicle (e.g., information regarding an outside ambient air temperature).

The battery system 102 may include one or more battery packs 112 suitably sized to provide electrical power to the vehicle 100. Each battery pack 112 may include one or more subdivisions 114 (e.g., cells). The subdivisions 114 may comprise sub-packs, each of which may comprise one or more battery cells utilizing any suitable battery technology or combination thereof. Suitable battery technologies may include, for example, lead-acid, nickel-metal hydride ("NiMH"), lithium-ion ("Li-Ion"), Li-Ion polymer, lithium-air, nickel-cadmium ("NiCad"), valve-regulated lead-acid ("VRLA") including absorbed glass mat ("AGM"), nickel-zinc ("NiZn"), molten salt (e.g., a ZEBRA battery), nickel manganese cobalt ("NMC"), lithium iron phosphate ("LFP"), lithium manganese oxide ("LMO"), and/or other suitable battery technologies and/or combination thereof.

Each subdivision 114 may be associated with a sensor 106 configured to measure one or more parameters (e.g., temperature, voltage, current, impedance, SOC, etc.) associated with each battery subdivision 114. Although FIG. 1 illustrates separate sensors 106 associated with each battery subdivision 114, in some embodiments a sensor configured to measure various electrical parameters associated with a plurality of subdivisions 114 may also be utilized. In certain embodiments, the sensors 106 may be configured to measure a temperature of one or more associated battery subdivisions 114. In certain embodiments, the sensors 106 may comprise one or more thermistors, although it will be appreciated that other types of temperature measurement sensors may be utilized in connection with the disclosed systems and methods including, without limitation, thermocouples, infrared temperature sensors, thermostats, thermometers, change-of-state temperature sensors, silicon diode temperature sensors, and/or the like The electrical parameters measured by sensors 106 may be provided to battery control system 104 and/or one or more other systems. Using the electrical parameters, battery control system 104 and/or any other suitable system may coordinate the operation of battery system 102 (e.g., charging operations, discharging operations, balancing operations, etc.). In certain embodiments, one or more electrical parameters may be provided by battery control system 104 and/or one or more sensors 106 to vehicle computer system 108 and/or external computer system 110. Based on certain measured parameters, battery control system 104, vehicle computer system 108, and/or any other suitable system may estimate a temperature and/or a state of the battery system 102 and/or any of its constituent subdivisions 114 utilizing methods disclosed herein.

In some embodiments, to regulate the temperature of the battery system 102, the battery system 102 may include a cooling system 116. Although embodiments disclosed herein are discussed in connection with a liquid cooling system 116, it will be appreciated that embodiments may be similarly utilized in connection with air and/or gaseous cooling systems configured to circulate and/or distribute air from cabin HVAC and/or ducting output, from outside air, and/or from recirculated air within the battery, and/or any other type of heat addition and/or removal system (e.g., resistive heading elements placed between cells or the like). In the illustrated embodiments, the cooling system 116 may be configured to circulate and/or distribute an aqueous based liquid coolant to various components and/or systems included in the battery system 102, thereby regulating the temperature of the components and/or systems. In certain embodiments, the liquid cooling system may be further configured to circulate the liquid coolant to various components and/or systems included elsewhere in the vehicle 100. By utilizing a liquid cooling system 116 to regulate temperature of the battery system 102 (e.g., regulate the temperature within a desired range), the performance of the battery system 102 may be optimized, uneven temperature distributions in the battery system 102 may be reduced, and/or potential hazards attributable to uncontrolled battery temperature may be minimized. In certain embodiments, the operation of the cooling system 116 may be managed by the battery control system 104, the vehicle computer system 108, and/or any other suitable system or combination of systems.

The cooling system 116 may comprise any suitable number of pumps, valves coolant circulation paths (e.g., piping), coolant reservoirs, heat exchangers (e.g., liquid/liquid, liquid/air, liquid/AC unit, and the like), cooling system electronics (e.g., feedback mechanisms, temperature sensors, thermostats, coolant flow sensors, pump and heat exchanger control electronics, and the like), and/or any other cooling system component and/or system in any suitable configuration for circulating the liquid coolant to various components and systems included in the battery system 102. The liquid coolant may be a substantially aqueous coolant solution. In some embodiments, the liquid coolant may comprise any combination and/or concentration of water, methanol, glycol, ethylene glycol, propylene glycol, glycerol, Dex-Cool®, and/or any other suitable coolant material.

Figure 2:
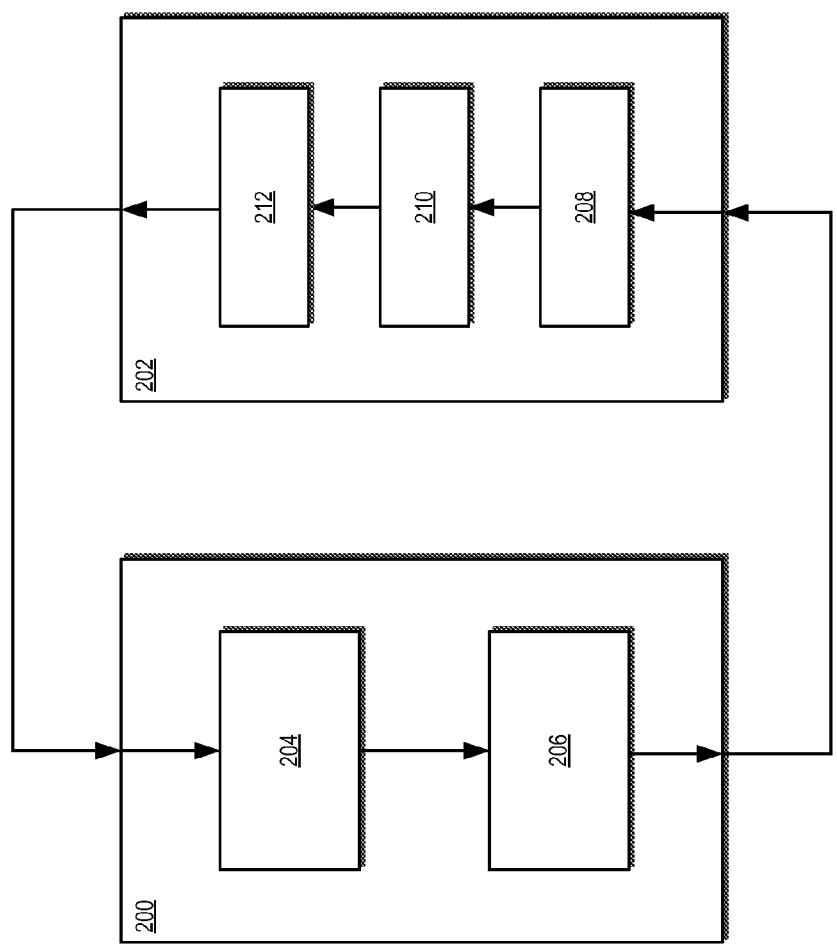
FIG. 2 illustrates a conceptual diagram of an exemplary method for estimating a temperature of a battery system consistent with embodiments disclosed herein.

FIG. 2 illustrates a conceptual diagram of an exemplary method for estimating a temperature of a battery system consistent with embodiments disclosed herein. In certain embodiments, one or more of the elements of the illustrated conceptual diagram may be performed by and/or implemented using a battery control system, a vehicle computer system, an external computer system, and/or any other system or combination of systems configured to implement temperature estimation methods consistent with the disclosed embodiments. In some embodiments, the illustrated diagram may implement embodiments of an EKF for temperature estimation consistent with the disclosed systems and methods.

In certain embodiments, the exemplary method may implement an EKF including a prediction stage 200 and an update stage 202. In some embodiments, the exemplary method may be recursive. For example, results from prior temperature estimations may be utilized in connection with future temperature estimations. In some embodiments, the EKF may utilize an energy balance process model and a coolant temperature based measurement model to estimate an average temperature of the battery in real time.

The prediction stage 200 may include a temperature prediction module 204. In some embodiments, the temperature prediction module 204 may provide an estimate of a battery temperature based on an energy balance process model. The energy balance process module may depend, at least in part, on a coolant temperature-based measurement model configured to vary based on an operational state of the battery system and/or an associated cooling system (e.g., vehicle driving, thermal soaking, active heating, active cooling, and/or cooling system pump operational states).

In some embodiments, the energy balance process model for estimating battery system temperature used by the temperature prediction module 204 may be expressed according to:

$$T_{batt_t} = T_{batt_{t-1}} + \frac{\Delta t}{C_{P_{batt}}}[k(T_{amb_{t-1}} - T_{batt_{t-1}}) + QITD_{cool}(T_{cool_{t-1}} - T_{batt_{t-1}}) + i_t^2 R_t] \quad \text{Eq. 1}$$

where:
$T_{batt_t}$=The average battery temperature estimate at time t
$T_{batt_{t-1}}$=The average battery temperature estimate at the previous execution frame (i.e., time t-1)
$C_{P_{batt}}$=The heat capacity of the battery pack (i.e., the energy to increase the temperature of the battery by 1 degree Celsius)
k=The characterized heat transfer between the battery and the surrounding ambient environment
$T_{amb_{t-1}}$=The current ambient temperature surrounding the battery at time t-1
$QITD_{cool}$=The characterized capability of the heat exchanger within the battery pack that may be dependent upon coolant flow rate
$T_{cool_t}$=The battery coolant inlet temperature at time t-1
$i_t$=The electrical current through the battery at time t
$R_t$=The battery resistance at time t The energy balance process model of Equation 1 may depend, at least in part, on a parameter, $T_{cool_t}$, reflecting a value associated with a temperature of battery system coolant at time t generated based on a coolant temperature-based measurement model. In certain embodiments, the parameter, $T_{cool_t}$, may vary based on an operational state of the battery system and/or an associated cooling system. Although embodiments disclosed herein are discussed in connection with an inlet coolant temperature for determining $T_{cool_t}$, it will be appreciated that a variety of other coolant temperatures may be utilized in connection with the disclosed embodiments include, for example, a battery coolant outlet coolant temperature. In some embodiments, the parameter may be generated based on the following:

$$T_{cool_t} = \begin{cases} T_{batt_t} + AHOffset & \text{when Active Heating } (AH) \\ T_{batt_t} - ACOffset & \text{when Active Cooling } (AC) \\ T_{batt_t} & \text{when Pump is On and not in } AH \text{ or } AC \\ T_{cool_t} & \text{when Pump is Off} \end{cases} \quad \text{Eq. 2}$$

where:
AHOffset=The active heating mode steady state temperature offset that may depend on factors such as flow rate
ACCalOffset=The active cooling mode steady state temperature offset that may depend on factors such as flow rate
$T_{batt_t}$=The average battery temperature estimate at time t
$T_{cool_t}$=The battery coolant inlet temperature at time t-1

As reflected in Equation 2, a value associated with parameter $T_{cool_t}$, used in connection with determining an estimated average temperature of the battery system at time t, $T_{batt_t}$, using Equation 1, may vary based on an operational state of the battery system and/or an associated cooling system. For example, the value of parameter $T_{cool_t}$ may vary when a battery system and/or an associated cooling system is undergoing active heating and/or active cooling operations and/or based on whether a battery conditioning pump associated with the cooling system is in either an off or an on state.

Embodiments of the disclosed EKF may, among other things, blend the energy balance process model and the coolant temperature-based measurement model based on an estimated noise associated with each model. Utilizing both the energy balance process model and the coolant temperature-based measurement model may allow for measured temperature estimation when a battery system is in a conditioning state and modeled temperature estimation when the battery system is not in a conditioning state. In further embodiments, the EKF may correct for actual temperature relatively quickly once the battery conditioning pump starts running, thereby correcting for less accurate initial temperature estimations.

The prediction stage 200 may further include a process error covariance module 206. In certain embodiments, the process error convariance module 206 may estimate an error covariance associated with the information used to determine the estimated average temperature.

The estimated temperature and covariance determined by modules 204, 206 of the prediction stage 200 may be passed to the update stage 202. In certain embodiments, the update stage 202 may incorporate newer temperature estimate information generated by the prediction stage 200 with prior temperature estimate information to generate an updated temperature estimate having increased accuracy. The update stage 202 may include a Kalman gain calculation module 208, a state estimate update module 210, and a measurement error covariance update module 212. The Kalman gain calculation module 208 may calculate a Kalman gain used to update the estimated temperature by the state estimate update module 210 and may provide the calculated gain to update the measurement error covariance by the measurement error covariance update module 212. The measurement error covariance update module 212 may provide an indication of measurement error covariance based on received temperature sensor measurements and the Kalman gain from the Kalman gain calculation module 208. The state estimate measurement update module 210 may determine an updated estimated temperature estimate based on information generated by the prediction stage 200, the Kalman gain from the Kalman gain calculation module 208 and prior measurement information. In certain embodiments, the Kalman gain calculated by the Kalman gain calculation module 208 may be an estimate of both the process error covariance and the measurement error covariance.

In certain embodiments, the Kalman gain may be calculated based on the estimated error from both the prediction stage 200 temperature estimate and the error associated with the measurement model. This may function as a weighting to determine how heavily to weight the predicted temperature from the process model (e.g., implemented using Equation 1) relative to the measurement model (e.g., implemented using Equation 2). The state estimate measurement update module 210 may calculate a predicted temperature based on the Kalman gain, the process model update, and the measurement model estimate.

After temperature is predicted by the state estimate measurement update module 210, a new measurement error covariance is calculated and provided to the prediction stage 200 which may use it to update the predicted temperature error on a subsequent cycle. The two error covariances (process and measurement) may be passed back and forth between the prediction stage 200 and the update stage 202 and be updated so that the EKF can determine how much weight should be given the previous iteration's estimation of the temperature vs the current iteration's estimate of temperature.

Figure 3:
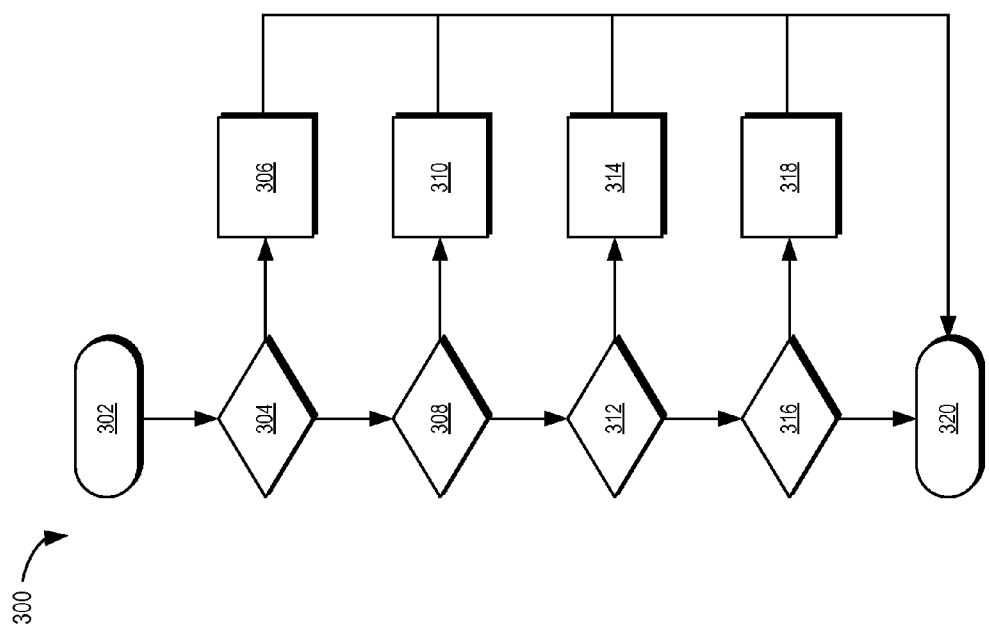
FIG. 3 illustrates a flow chart of an exemplary method for estimating a temperature of a battery system consistent with embodiments disclosed herein.

FIG. 3 illustrates a flow chart of an exemplary method 300 for estimating a temperature of a battery system consistent with embodiments disclosed herein. In certain embodiments, one or more of the illustrated elements of method 300 may be performed by and/or implemented using a battery control system, a vehicle computer system, an external computer system, and/or any other system or combination of systems configured to implement temperature estimation methods consistent with embodiments disclosed herein.

At 302, the method 300 may initiate. At 304, it may be determined whether a battery system and/or an associated cooling system are undergoing active heating operations. If the battery system and/or the associated cooling system are undergoing active heating operations, the method 300 may proceed to 306. At 306, an estimated average battery system temperature may be calculated using Equation 1 based on a value of $T_{cool_t}$ corresponding to the sum of $T_{batt_t}$ and AHOffset, as reflected in Equation 2. If the battery system and/or the associated cooling system are not undergoing active heating operations, the method may proceed to 308.

At 308, it may be determined whether the battery system and/or the associated cooling system are undergoing active cooling operations. If the battery system and/or the associated cooling system are undergoing active cooling operations, the method 300 may proceed to 310. At 310, an estimated average battery system temperature may be calculated using Equation 1 based on a value of $T_{cool_t}$ corresponding to the difference between $T_{batt_t}$ and ACOffset as reflected in Equation 2. If the battery system and/or the associated cooling system are not undergoing cooling or heating operations, the method may proceed to 312.

At 312, it may be determined whether a battery conditioning pump associated with the cooling system is in an on state but the system is neither actively cooling or actively heating. If the battery conditioning pump associated with the cooling system is in an on state, the method 300 may proceed to 314. At 314, an estimated average battery system temperature may be calculated using Equation 1 based on a value of $T_{cool_t}$ corresponding to $T_{batt_t}$ as reflected in Equation 2. If the battery conditioning pump associated with the cooling system is in an off state, the method may proceed to 316.

At 316, it may be determined whether the battery conditioning pump associated with the cooling system is in an off state. If the battery conditioning pump associated with the cooling system is in an off state, the method 300 may proceed to 316. At 318, an estimated average battery system temperature may be calculated using Equation 1 based on a value of $T_{cool_t}$ corresponding to $T_{cool_t}$ as reflected in Equation 2. The method may proceed to terminate at 320.

Figure 4:
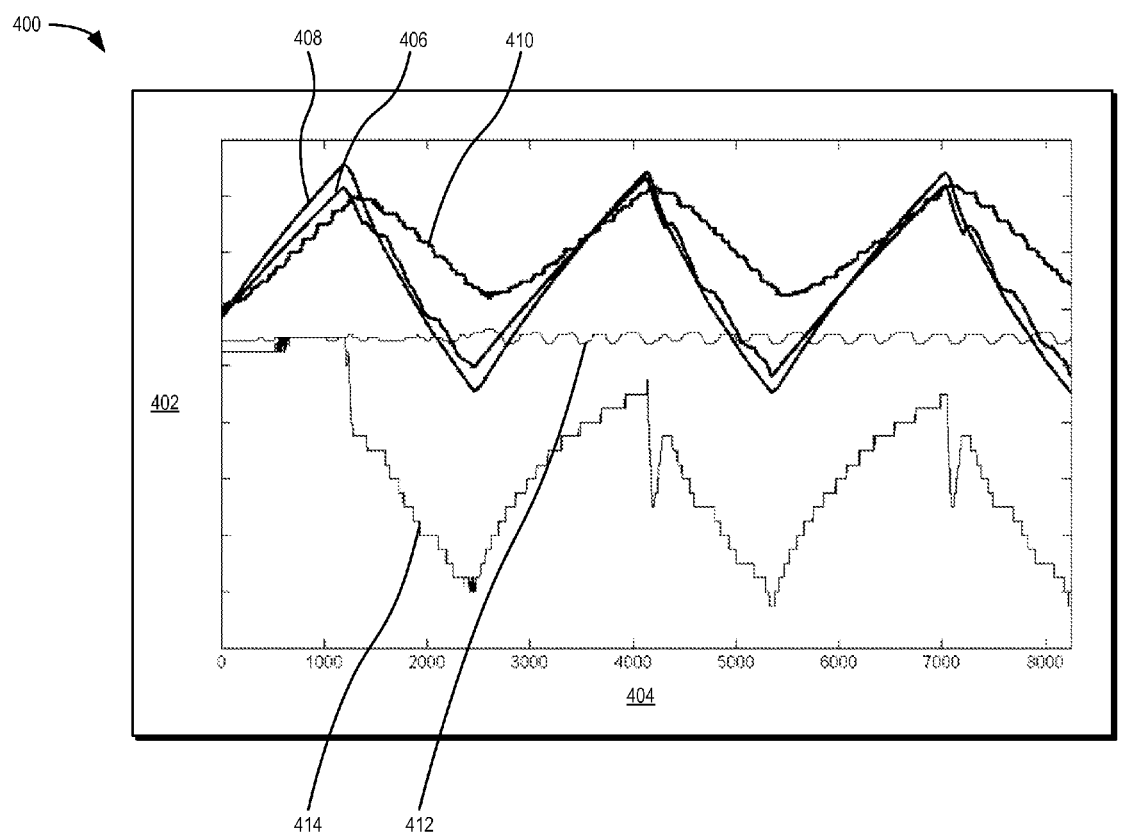
FIG. 4 illustrates a graph showing exemplary battery system temperature measurements and estimations consistent with embodiments disclosed herein.

FIG. 4 illustrates a graph 400 showing exemplary battery system temperature measurements and estimations consistent with embodiments disclosed herein. The y-axis 402 of graph 400 represents temperature and the x-axis 404 represents time. Curve 406 illustrates an average estimated temperature of an exemplary battery system determined using embodiments of the systems and methods disclosed herein and curve 408 illustrates the actual battery system temperature. Curve 410 illustrates a temperature of the battery system determined using thermistor measurements. Curve 412 illustrates ambient temperature proximate to the battery system, and curve 414 illustrates an inlet coolant temperature of the battery system. As illustrated in connection with graph 400, embodiments of the systems and methods disclosed herein may provide a more accurate average estimated temperature (i.e., curve 406) relative to actual battery system temperature (i.e., curve 408) than that provided using thermistor measurements along (i.e., curve 410).

Figure 5:
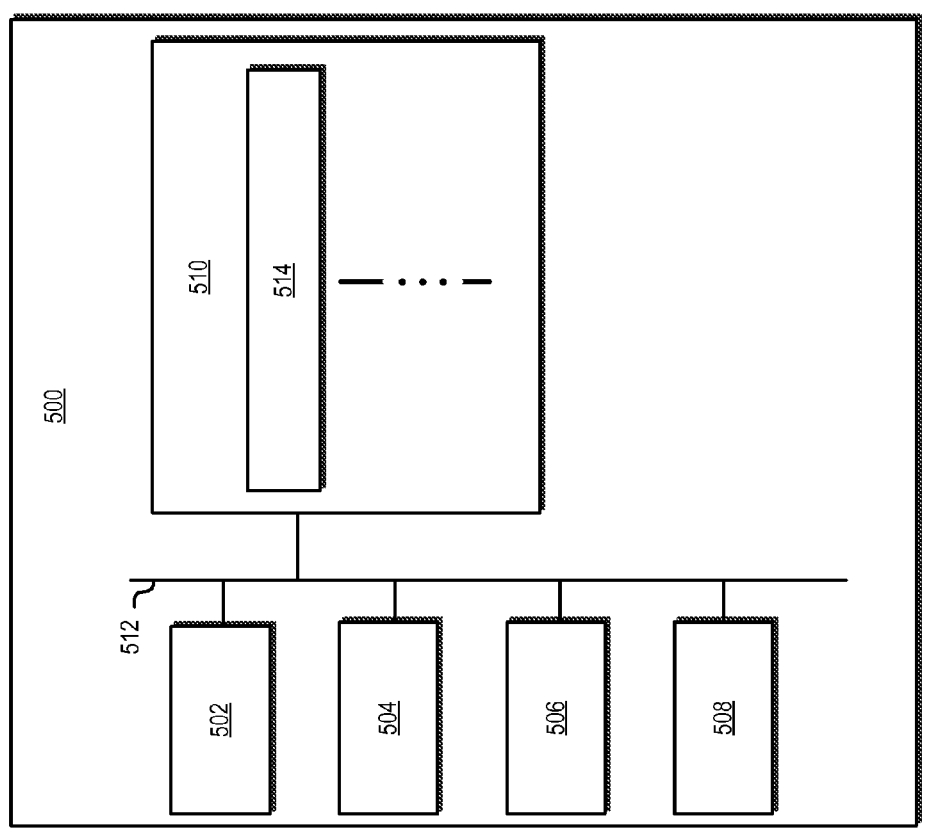
FIG. 5 illustrates an exemplary system for implementing certain embodiments of the systems and methods disclosed herein.

FIG. 5 illustrates an exemplary system for implementing certain embodiments of the systems and methods disclosed herein. In certain embodiments, the computer system 500 may be a personal computer system, a server computer system, an on-board vehicle computer, a battery control system, and/or any other type of system suitable for implementing the disclosed systems and methods. In further embodiments, the computer system 500 may be any portable electronic computer system or electronic device including, for example, a notebook computer, a smartphone, and/or a tablet computer.

As illustrated, the computer system 500 may include, among other things, one or more processors 502, random access memory ("RAM") 504, a communications interface 506, a user interface 508, and a non-transitory computer-readable storage medium 510. The processor 502, RAM 504, communications interface 506, user interface 508, and computer-readable storage medium 510 may be communicatively coupled to each other via a common data bus 512. In some embodiments, the various components of the computer system 500 may be implemented using hardware, software, firmware, and/or any combination thereof.

The user interface 508 may include any number of devices allowing a user to interact with the computer system 500. For example, the user interface 508 may be used to display an interactive interface to a user. The user interface 508 may be a separate interface system communicatively coupled with the computer system 500 or, alternatively, may be an integrated system such as a display interface for a laptop or other similar device. In certain embodiments, the user interface 508 may be produced on a touch screen display. The user interface 508 may also include any number of other input devices including, for example, keyboard, trackball, and/or pointer devices.

The communications interface 506 may be any interface capable of communicating with other computer systems, peripheral devices, and/or other equipment communicatively coupled to computer system 500. For example, the communications interface 506 may allow the computer system 500 to communicate with other computer systems (e.g., computer systems associated with external databases and/or the Internet), allowing for the transfer as well as reception of data from such systems. The communications interface 506 may include, among other things, a modem, a satellite data transmission system, an Ethernet card, and/or any other suitable device that enables the computer system 500 to connect to databases and networks, such as LANs, MANs, WANs and the Internet. In further embodiments, the communications interface 506 may further be capable of communication with one or more sensors and/or other systems configured to measure and/or otherwise provide information for use in connection with the disclosed embodiments.

Processor 502 may include one or more general purpose processors, application specific processors, programmable microprocessors, microcontrollers, digital signal processors, FPGAs, other customizable or programmable processing devices, and/or any other devices or arrangement of devices that are capable of implementing the systems and methods disclosed herein.

Processor 502 may be configured to execute computer-readable instructions stored on non-transitory computer-readable storage medium 510. Computer-readable storage medium 510 may store other data or information as desired. In some embodiments, the computer-readable instructions may include computer executable functional modules 514. For example, the computer-readable instructions may include one or more functional modules configured to implement all or part of the functionality of the systems and methods described above. Specific functional models that may be stored on computer-readable storage medium 510 may include a module configured to perform battery system temperature estimation methods and/or associated calculations consistent with embodiments disclosed herein, and/or any other module or modules configured to implement the systems and methods disclosed herein.

The system and methods described herein may be implemented independent of the programming language used to create the computer-readable instructions and/or any operating system operating on the computer system 500. For example, the computer-readable instructions may be written in any suitable programming language, examples of which include, but are not limited to, C, C++, Visual C++, and/or Visual Basic, Java, Perl, or any other suitable programming language. Further, the computer-readable instructions and/or functional modules may be in the form of a collection of separate programs or modules, and/or a program module within a larger program or a portion of a program module. The processing of data by computer system 500 may be in response to user commands, results of previous processing, or a request made by another processing machine. It will be appreciated that computer system 500 may utilize any suitable operating system including, for example, Unix, DOS, Android, Symbian, Windows, iOS, OSX, Linux, and/or the like.

Although the foregoing has been described in some detail for purposes of clarity, it will be apparent that certain changes and modifications may be made without departing from the principles thereof. It is noted that there are many alternative ways of implementing both the processes and systems described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A method of estimating a temperature of a battery system, the method comprising:
   receiving battery system temperature measurement data from one or more first temperature sensors associated with the battery system;
   receiving ambient temperature measurement data associated with an ambient temperature proximate to the battery system from one or more second sensors associated with the battery system; and
   determining an average estimated temperature of the battery system using, at least in part, an extended Kalman filter based on the battery system temperature measurement data, the ambient temperature measurement data, an energy balance process model associated with the battery system, and a temperature parameter.

2. The method of claim 1, wherein the temperature parameter comprises a temperature parameter associated with a cooling system configured to cool the battery system during operation.

3. The method of claim 2, wherein the temperature parameter associated with the cooling system comprises an inlet coolant temperature of the battery system.

4. The method of claim 2, wherein the temperature parameter associated with the cooling system comprises an outlet coolant temperature of the battery system.

5. The method of claim 1, wherein the temperature parameter associated with the cooling system is determined based on a coolant temperature-based measurement model.

6. The method of claim 5, wherein the temperature parameter associated with the cooling system varies based on an operational state of the cooling system.

7. The method of claim 6, wherein the temperature parameter associated with the cooling system is based on a sum of the average estimated temperature of the battery system and an offset temperature when the cooling system is in an active heating state.

8. The method of claim 6, wherein the temperature parameter associated with the cooling system is based on a difference between the average estimated temperature of the battery system and an offset temperature when the cooling system is in an active cooling state.

9. The method of claim 6, wherein the temperature parameter associated with the cooling system is based on the average estimated temperature of the battery system when a pump of the cooling system is in an off state.

10. The method of claim 6, wherein the temperature parameter associated with the cooling system is based on a measured coolant temperature when a pump of the cooling system is in an on state but neither actively heating nor actively cooling.

11. A system comprising:
    a battery system;
    one or more first temperature sensors configured to measure temperature data associated with the battery system;
    one or more second temperature sensors configured to measure ambient temperature data associated with an ambient temperature proximate to the battery system;
    one or more current sensors configured to measure current data associated with the battery system;
    battery control electronics communicatively coupled to the one or more first temperature sensors, the one or more second temperature sensors, and the one or more current sensors, the battery control electronics being configured to:
      receive the battery system temperature measurement data;
      receive the ambient temperature measurement data;
      receive the current measurement data; and
      determine an average estimated temperature of the battery system using, at least in part, an extended Kalman filter based on the battery system temperature measurement data, the ambient temperature measurement data, the current measurement data, an energy balance process model associated with the battery system, and a temperature parameter associated with the cooling system.

12. The system of claim 11, wherein the system further comprises a cooling system coupled to the battery system configured to cool the battery system during operation and wherein the temperature parameter is associated with the cooling system.

13. The system of claim 12, wherein the temperature parameter associated with the cooling system comprises an inlet coolant temperature of the battery system.

14. The system of claim 12, wherein the temperature parameter associated with the cooling system comprises an outlet coolant temperature of the battery system.

15. The system of claim 12, wherein the temperature parameter is determined based on a coolant temperature-based measurement model.

16. The system of claim 15, wherein the temperature parameter varies based on an operational state of the cooling system.

17. The system of claim 15, wherein the temperature parameter associated with the cooling system is based on a sum of the average estimated temperature of the battery system and an offset temperature when the cooling system is in an active heating state.

18. The system of claim 15, wherein the temperature parameter associated with the cooling system is based on a difference between the average estimated temperature of the battery system and an offset temperature when the cooling system is in an active cooling state.

19. The system of claim 15, wherein the temperature parameter associated with the cooling system is based on the average estimated temperature of the battery system when a pump of the cooling system is in an off state.

20. The system of claim 15, wherein the temperature parameter associated with the cooling system is based on a measured coolant temperature when a pump of the cooling system is in an off state.

\* \* \* \* \*